United States Patent
Kayashima et al.

(10) Patent No.: US 10,150,845 B2
(45) Date of Patent: Dec. 11, 2018

(54) VULCANIZATES AND TIRE COMPONENTS PREPARED FROM COMPOSITIONS INCLUDING MERCAPTO-FUNCTIONAL SILOXANES

(71) Applicant: Bridgestone Corporation, Chuo-ku (JP)

(72) Inventors: Kentaro Kayashima, Chuo-ku (JP); Terrence E. Hogan, Uniontown, OH (US)

(73) Assignee: Bridgestone Corporation, Chuo-ku (JP)

( * ) Notice: Subject to any disclaimer, the term of this patent is extended or adjusted under 35 U.S.C. 154(b) by 26 days.

(21) Appl. No.: 15/108,022

(22) PCT Filed: Dec. 29, 2014

(86) PCT No.: PCT/US2014/072511
§ 371 (c)(1),
(2) Date: Jun. 24, 2016

(87) PCT Pub. No.: WO2015/100449
PCT Pub. Date: Jul. 2, 2015

(65) Prior Publication Data
US 2016/0333151 A1 Nov. 17, 2016

Related U.S. Application Data

(60) Provisional application No. 61/921,153, filed on Dec. 27, 2013.

(51) Int. Cl.
| | | |
|---|---|---|
| *C08J 3/22* | (2006.01) |
| *B60C 1/00* | (2006.01) |
| *C08L 21/00* | (2006.01) |
| *C08L 83/10* | (2006.01) |
| *C08K 3/011* | (2018.01) |
| *C08K 3/013* | (2018.01) |
| *C08K 5/548* | (2006.01) |
| *C08K 3/06* | (2006.01) |
| *C08K 3/36* | (2006.01) |
| *C08L 7/00* | (2006.01) |
| *C08L 9/06* | (2006.01) |
| *C08L 83/04* | (2006.01) |

(52) U.S. Cl.
CPC .............. *C08J 3/226* (2013.01); *B60C 1/0016* (2013.01); *C08K 3/011* (2018.01); *C08K 3/013* (2018.01); *C08L 21/00* (2013.01); *C08L 83/10* (2013.01); *C08J 2309/06* (2013.01); *C08J 2351/04* (2013.01); *C08J 2407/00* (2013.01); *C08J 2483/08* (2013.01); *C08K 3/06* (2013.01); *C08K 3/36* (2013.01); *C08K 5/548* (2013.01); *C08L 7/00* (2013.01); *C08L 9/06* (2013.01); *C08L 83/04* (2013.01)

(58) Field of Classification Search
CPC ......... C08J 3/226; C08L 83/10; B60C 1/0016
See application file for complete search history.

(56) References Cited

U.S. PATENT DOCUMENTS

| | | | |
|---|---|---|---|
| 5,723,531 A | 3/1998 | Visel et al. | |
| 5,929,149 A | 7/1999 | Matsuo et al. | |
| 5,994,456 A * | 11/1999 | Klosowski | C08K 5/0025 524/413 |
| 6,022,923 A | 2/2000 | Araki et al. | |
| 6,156,822 A | 12/2000 | Mateme et al. | |
| 6,177,505 B1 | 1/2001 | Yatsuyanagi et al. | |
| 6,313,205 B1 | 11/2001 | Chiron et al. | |
| 6,313,220 B1 | 11/2001 | Mateme et al. | |
| 6,362,253 B1 | 3/2002 | Durel | |
| 6,667,362 B2 | 12/2003 | Robert et al. | |
| 6,759,486 B2 | 7/2004 | Luginsland et al. | |
| 7,301,042 B2 | 11/2007 | Cruse | |
| 2004/0158090 A1 | 8/2004 | Krafczyk et al. | |
| 2005/0277717 A1 | 12/2005 | Joshi et al. | |
| 2006/0063879 A1 | 3/2006 | Zanzig | |
| 2009/0126845 A1 | 5/2009 | Hogan et al. | |
| 2009/0209699 A1 | 8/2009 | Weinreich et al. | |
| 2010/0108239 A1 | 5/2010 | Recker et al. | |
| 2011/0098389 A1 | 4/2011 | Yoo et al. | |

FOREIGN PATENT DOCUMENTS

| | | |
|---|---|---|
| CN | 1265126 A | 8/2000 |
| CN | 102690449 A | 9/2012 |
| DE | 2008426 A1 | 9/1970 |
| JP | 2012153865 A | 8/2012 |

OTHER PUBLICATIONS

Machine translation of JP 2012-153865 original publication date (2012).*
Engel Hermann, International Search Report with Written Opinion from PCT/US2014/072511, 13 pp. (dated Jul. 23, 2015).

* cited by examiner

*Primary Examiner* — Edward J Cain
(74) *Attorney, Agent, or Firm* — Meredith E. Hooker; Arthur M. Reginelli

(57) ABSTRACT

A vulcanizate prepared by a method comprising introducing an elastomer, a filler, and a mercapto-functional siloxane to form a masterbatch and introducing a curative to the masterbatch to form a vulcanizable composition.

15 Claims, No Drawings

# VULCANIZATES AND TIRE COMPONENTS PREPARED FROM COMPOSITIONS INCLUDING MERCAPTO-FUNCTIONAL SILOXANES

This application claims the benefit of U.S. Provisional Application Ser. No. 61/921,153, filed on Dec. 27, 2013, which is incorporated herein by reference.

FIELD OF THE INVENTION

Embodiments of the present invention are directed toward vulcanizates and tire components prepared from vulcanizable compositions that are prepared using a mercapto-functional polysiloxane. In one or more embodiments, it is believed that the mercapto-functional polysiloxane reacts with diene-based rubber within the vulcanizable composition to produce a polysiloxane-grafted diene-based polymer.

BACKGROUND OF THE INVENTION

Rubber tires employing tire treads have been used for more than one century. As the skilled person appreciates, the tire tread provides the interface between the tire and the road surface and, thus, is important to the traction performance of the tire. Particularly useful for certain applications are tire treads with excellent wet traction performance. However, due to numerous complex factors involved, such as the hysteretic bulk deformation of the tread rubber induced by road surface asperities, the rate of water drainage between the tread rubber and the road, lubrication by trapped water or other possible lubricants, and the possible adhesive interactions between the tread rubber and the road, the quantitative mechanisms attributable to improved wet traction performance are not completely understood.

U.S. Pat. No. 6,667,362 teaches rubber compositions having hysteresis properties at small and large deformations that are comparable to prior art functionalized diene polymers while having advantageous processing properties in the non-vulcanized state. The rubber compositions include a reinforcing white filler and at least one diene block copolymer which is intended to interact with said reinforcing white filler, wherein said copolymer comprises on at least one end thereof a polysiloxane block ending in a trialkylsilyl group. The diene block copolymer is prepared by reacting a living diene polymer with a polysiloxane block or by sequential polymerization.

SUMMARY OF THE INVENTION

One or more embodiments of this invention provide a vulcanizate prepared by a method comprising introducing an elastomer, a filler, and a mercapto-functional siloxane to form a masterbatch and introducing a curative to the masterbatch to form a vulcanizable composition.

Other embodiments of this invention provide a vulcanizable composition comprising an elastomer, from about 0.5 to about 20 parts by weight of a mercapto-functional siloxane per one hundred parts by weight elastomer, from about 5 to about 200 parts by weight of a filler, and a curative for the elastomer.

Other embodiments of this invention provide the use of a mercapto-functional siloxane in the preparation of a tire tread.

Other embodiments of this invention provide a graft copolymer prepared by introducing a diene-based elastomer and a mercapto-functional siloxane to form a mixture and subjecting the mixture to conditions that will react the mercapto-functional siloxane to the diene-based elastomer.

Other embodiments of this invention provide a method for preparing a tire, the method comprising introducing an elastomer, a filler, and a mercapto-functional siloxane to form a masterbatch, introducing a curative to the masterbatch to form a vulcanizable composition, forming the vulcanizable composition into a green tire tread, building a green tire by using the green tire tread as the tire tread component of the green tire, and subjecting the green tire to curing conditions to form a tire.

Other embodiments of this invention provide a vulcanizable composition of matter comprising an elastomer, a graft copolymer prepared by reacting a mercapto-functional siloxane with a diene-based elastomer, a filler, and a curative.

DETAILED DESCRIPTION OF ILLUSTRATIVE EMBODIMENTS

Embodiments of the invention are based, at least in part, on the discovery of a rubber vulcanizate that is prepared from a vulcanizable composition that includes a mercapto-functional siloxane polymer. The vulcanizate of one or more embodiments advantageously demonstrates one or more of relatively low hysteretic loss, relatively high wet skid resistance, and relatively low bleed of siloxane polymer from the vulcanizate. As a result, the vulcanizates of this invention are advantageously useful as tire treads.

Vulcanizable Composition

In one or more embodiments, the vulcanizable compositions of matter of this invention are prepared by combining an elastomer, a filler, a curative, and a mercapto-functional polysiloxane. Other optional ingredients may include those ingredients that are included in vulcanizable compositions of this nature including, but not limited to, cure activators, cure accelerators, oils, resins, plasticizers, pigments, fatty acids, zinc oxide, and peptizing agents. In one or more of these embodiments, it is believed that the mercapto-functional polysiloxane reacts with the elastomer (e.g. a diene-based elastomer) to form a graft copolymer. In one or more embodiments, this reaction is believed to take place in situ during solid-state mixing of the elastomer and the mercapto-functional polysiloxane at one or more appropriate conditions that lead to graft copolymer formation.

In other embodiments, the graft copolymer is pre-formed by reacting a diene-based elastomer with the mercapto-functional polysiloxane. This graft copolymer may then be employed to form a vulcanizable composition of matter by combining this graft copolymer with optional additional elastomer, filler, and curative.

Rubber

In one or more embodiments, the elastomer employed to prepare the vulcanizable compositions of this invention may include those polymers that can be vulcanized to form compositions possessing rubbery or elastomeric properties. These elastomers may include natural and synthetic rubbers. These elastomers may include those that react with the mercapto-functional siloxanes or they may include those otherwise added to and present with the vulcanizable composition of matter. In other words, the vulcanizable compositions may include elastomers other that those that react with the mercapto-functional siloxanes.

In one or more embodiments, reference may be made to diene-based elastomers, which include those synthetic rubbers that derive from the polymerization of conjugated diene monomer or the copolymerization of conjugated diene monomer with one or more comonomer such as vinyl-substituted aromatic monomer. For purposes of this specification, elastomers deriving from the polymerization of conjugated dienes may be referred to as diene-based elastomers. Conjugated diene monomers include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and combinations thereof. As suggested above, the diene-based elastomer can include copolymers where the conjugated diene is copolymerized with comonomer such as, but not limited to, vinyl aromatic monomer such as styrene, α-methylstyrene, p-methylstyrene, o-methylstyrene, p-butylstyrene, vinylnaphthalene, and combinations thereof.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms.

In one or more embodiments, useful elastomers include high molecular weight polymers such as those having a number average molecular weight in excess of 50 kg/mol, in other embodiments in excess of 100 kg/mol, in other embodiments in excess of 125 kg/mol, and in other embodiments in excess of 150 kg/mol.

Filler

The filler may include one or more conventional reinforcing or non-reinforcing fillers. For example, useful fillers include carbon black, silica, alumina, and silicates such as calcium, aluminum, and magnesium silicates. In particular embodiments, the vulcanizable compositions of this invention include a silica filler used in combination with a silica coupling agent.

In one or more embodiments, carbon blacks include furnace blacks, channel blacks, and lamp blacks. More specific examples of carbon blacks include super abrasion furnace (SAF) blacks, intermediate super abrasion furnace (ISAF) blacks, high abrasion furnace (HAF) blacks, fast extrusion furnace (FEF) blacks, fine furnace (FF) blacks, semi-reinforcing furnace (SRF) blacks, medium processing channel blacks, hard processing channel blacks, conducting channel blacks, and acetylene blacks. Representative carbon blacks useful in one or more embodiments may include those designated by ASTM D1765 as N326, N330, N339, N343, N347, N351, N358, N550, N650, N660, N762, N772, and N774.

In particular embodiments, the carbon blacks may have a surface area (EMSA) of at least 20 m$^2$/g, in other embodiments at least 35 m$^2$/g, in other embodiments at least 50 m$^2$/g, in other embodiments at least 60 m$^2$/g; surface area values can be determined by ASTM D-1765 using the cetyltrimethylammonium bromide (CTAB) technique. In particular embodiments, the sidewalls include carbon black filler having a surface area (EMSA) of from about 60 to about 110 m$^2$/g. The carbon blacks may be in a pelletized form or an unpelletized flocculent form. The preferred form of carbon black may depend upon the type of mixing equipment used to mix the rubber compound. Exemplary carbon blacks that are useful in the practice of this invention include those characterized by ASTM D-1765, such as N-110, N-220, N-339, N-330, N-351, N-550, N-660, and N990 grades.

In one or more embodiments, the filler may include silica. When silica is used as a filler, the silica may be employed in conjunction with a coupling agent. In these or other embodiments, the silica may be used in conjunction with a silica dispersing agent.

In one or more embodiments, useful silicas include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. In particular embodiments, the silica is a precipitated amorphous wet-processed hydrated silica. In one or more embodiments, these silicas are produced by a chemical reaction in water, from which they are precipitated as ultra-fine, spherical particles. These primary particles are believed to strongly associate into aggregates, which in turn combine less strongly into agglomerates.

Some commercially available silicas that may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the surface area. The BET surface area of silica is generally less than 450 m$^2$/g. Useful ranges of surface area include from about 32 to about 400 m$^2$/g, about 100 to about 250 m$^2$/g, and about 150 to about 220 m$^2$/g.

In one or more embodiments, the pH of silica may be from about 5 to about 7 or slightly over 7, or in other embodiments from about 5.5 to about 6.8.

In one or more embodiments, useful silica coupling agents include sulfur-containing silica coupling agents. Examples of sulfur-containing silica coupling agents include bis(trialkoxysilylorgano)polysulfides or mercapto-organoalkoxysilanes. Types of bis(trialkoxysilylorgano)polysulfides include bis(trialkoxysilylorgano) disulfide and bis(trialkoxysilylorgano)tetrasulfides. Exemplary silica dispersing aids include, but are not limited to an alkyl alkoxysilane, a fatty acid ester of a hydrogenated or non-hydrogenated $C_5$ or $C_6$ sugar, a polyoxyethylene derivative of a fatty acid ester of a hydrogenated or non-hydrogenated $C_5$, or $C_6$sugar, and mixtures thereof, or a mineral or non-mineral additional filler.

Still other useful fillers that may be used, especially in conjunction with silica and/or carbon black include, but are not limited to, mineral fillers such as clay (e.g., hydrous aluminum silicate), talc (hydrous magnesium silicate), aluminum hydrate ($Al(OH)_3$), and mica; as well as metal oxides such as aluminum oxide; and the like. Additional useful fillers suitable for use in the rubber compositions disclosed herein are known to those skilled in the art Curative A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, (3$^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, (2nd Ed. 1989), which are incorporated herein by reference. In one or more embodiments, the curative is sulfur. Examples of suitable sulfur vulcanizing agents include "rubberrmaker's" soluble sulfur; sulfur donating vulcanizing agents, such as an amine disulfide, polymeric polysulfide or sulfur olefin adducts; and insoluble polymeric sulfur. Vulcanizing agents may be used alone or in combination.

In one or more embodiments, the curative is employed in combination with a cure accelerator. In one or more embodiments, accelerators are used to control the time and/or temperature required for vulcanization and to improve properties of the vulcanizate. Examples of accelerators include thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like.

Mercapto-Functional Polysiloxanes

In one or more embodiments, the mercapto-functional polysiloxanes, which may also be referred to as mercapto-modified siloxanes, mercapto-modified polysiloxanes, or mercapto-modified silicones, include copolymers that include at least one of the each of the following units:

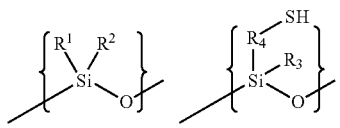

where $R^1$, $R^2$, and $R^3$ are each independently a monovalent organic group and each $R^4$ is a divalent organic group.

In particular embodiments, the mercapto-modified polysiloxanes may be defined by the formula

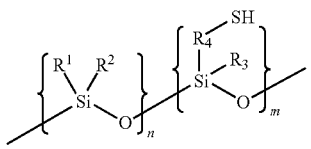

where $R^1$, $R^2$, and $R^3$ are each independently a monovalent organic group, each $R^4$ is a divalent organic group, and m and n are integers and the ratio of m to (m+n) is from about 0.03 to about 0.08.

In one or more embodiments, the monovalent organic group includes hydrocarbyl groups such as but not limited to alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group preferably containing from 1 carbon atom, or the appropriate minimum number of carbon atoms to form the group, up to 20 carbon atoms. These hydrocarbyl groups may contain heteroatoms such as, but not limited to, nitrogen, oxygen, silicon, sulfur, and phosphorus atoms.

The divalent organic group includes a hydrocarbylene group or substituted hydrocarbylene group such as, but not limited to, alkylene, cycloalkylene, substituted alkylene, substituted cycloalkylene, alkenylene, cycloalkenylene, substituted cycloalkenylene, substituted cycloalkenylene, arylene, and substituted arylene groups, with each group preferably containing from 1 carbon atom, or the appropriate minimum number of carbon atoms to form the group, up to about 20 carbon atoms. A substituted hydrocarbylene group is a hydrocarbylene group in which one or more hydrogen atoms have been replaced by a substituent such as an alkyl group. The divalent organic groups may also contain one or more heteroatoms such as, but not limited to, nitrogen, oxygen, boron, silicon, sulfur and phosphorous atoms.

In one or more embodiments, suitable mercapto-functionalized polysiloxanes include poly(dimethylsiloxane-co-mercaptopropylmethylsiloxane). In other embodiments, useful mercapto-functionalized siloxanes include dimethoxy mercapto propyl terminated siloxanes.

In one or more embodiments, useful mercapto-functional polysiloxanes are known in the art as described in U.S. Pat. Publ. Nos. 2009/0126845 and 2010/0284957, which are incorporated herein by reference. Useful mercapto-functional siloxanes can be purchased under the tradenames KF-2001 and KF-2004 from Shin-Etsu Chemical Co., Ltd.; SMS-022, SMS-042 and SMS-992 from Gelest, Inc.; and PS848, PS849, PS849.5, PS850, PS850.5 and PS927 from United Chemical Technologies. These commercial products each differ with respect to weight-average molecular weight, molecular weight distribution, and mercapto group ratio, and they can be selected as desired.

In one or more embodiments, the average number of repeating monomer units with the mercapto-modified siloxane is from about 90 to about 410, in other embodiments from about 110 to about 350, and in other embodiments from about 130 to about 300. In these or other embodiments, the molecular weight of the mercapto-modified siloxane is from about 5,000 about 50,000 g/mol, in other embodiments from about 6,800 to about 30,000 g/mol, and in other embodiments from about 7,500 to about 25,000 g/mol.

In one or more embodiments, after polymerization and cross-linking, solid siloxane samples will present an external hydrophobic surface. This surface chemistry may make it difficult for polar solvents (such as water) to wet the siloxane surface, and may lead to adsorption of hydrophobic contaminants. Plasma oxidation can be used to alter the surface chemistry, adding silanol (SiOH) groups to the surface. This treatment renders the siloxane surface hydrophilic, allowing water to wet the surface. The oxidized surface resists adsorption of hydrophobic and negatively charged species. The oxidized surface can be further functionalized by reaction with trichlorosilanes. Oxidized surfaces are stable for ~30 minutes in air, after a certain time hydrophobic recovery of the surface is inevitable independently of the surrounding medium whether it is vacuum, air, or water.

In one or more embodiments, silane precursors with more acid forming groups and fewer methyl groups, such as methyltrichlorosilane, can be used to introduce branches or cross links in the polymer chain. Under ideal conditions, each molecule of such a compound becomes a branch point. This can be used to produce hard silicone resins. In a similar manner, precursors with three methyl groups can be used to limit molecular weight, since each such molecule has only one reactive site and so forms the end of a siloxane chain.

In one or more embodiments, the siloxane polymer is manufactured in multiple viscosities, ranging from a thin pourable liquid (when n is very low), to a thick rubbery semi-solid (when n is very high). The siloxane molecules have quite flexible polymer backbones (or chains) due to their siloxane linkages. In one or more embodiments, these flexible chains become loosely entangled when molecular weight is high, which may result in siloxanes with unusually high level of viscoelasticity, and the loss tangent is very low (tan δ<<0.001).

Other Ingredients

Other ingredients that are typically employed in rubber compounding may also be added to the rubber compositions. These include oils, plasticizer, waxes, scorch inhibiting agents, processing aids, zinc oxide, tackifying resins, reinforcing resins, fatty acids such as stearic acid, peptizers and antidegradants such as antioxidants, antiozonants, and waxes. In particular embodiments, the oils that are employed include those conventionally used as extender oils, which are described above. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Ingredient Amounts

Rubber

In one or more embodiments, the vulcanizable compositions include at least 20, in other embodiments at least 30, and in other embodiments at least 40 percent by weight of the rubber component, based upon the entire weight of the composition. In these or other embodiments, the vulcanizable compositions include at most 90, in other embodiments at most 70, and in other embodiments at most 60 percent by weight of the rubber component based on the entire weight of the composition. In one or more embodiments, the vulcanizable compositions include from about 20 to about 90, in other embodiments from about 30 to about 70, and in other embodiments from about 40 to about 60 percent by weight of the rubber component based upon the entire weight of the composition.

Filler

In one or more embodiments, the vulcanizable compositions include at least 5, in other embodiments at least 25, and in other embodiments at least 40 parts by weight (pbw) filler (e.g. silica) per 100 parts by weight rubber (phr). In these or other embodiments, the vulcanizable composition includes at most 200, in other embodiments at most 120, and in other embodiments at most 70 pbw of the filler phr. In one or more embodiments, the vulcanizable composition includes from about 5 to about 200, in other embodiments from about 10 to about 100, in other embodiments from about 25 to about 120, and in other embodiments from about 40 to about 70 pbw of filler phr.

Mercapto-Functional Siloxane

In one or more embodiments, the vulcanizable compositions include at least 0.5, in other embodiments at least 2.0, in other embodiments at least 3.0, in other embodiments at least 4.0, and in other embodiments at least 5.0 parts by weight (pbw) mercapto-functional siloxane per 100 parts by weight rubber (phr). In these or other embodiments, the vulcanizable composition includes at most 20, in other embodiments at most 15, in other embodiments at most 12, in other embodiments at most 10 pbw mercapto-functional siloxane phr. In one or more embodiments, the vulcanizable composition includes from about 0.5 to about 20, in other embodiments from about 3.0 to about 12, and in other embodiments from about 5.0 to about 10 pbw mercapto-functional siloxane phr. In one or more embodiments, reference to the amount of mercapto-functional siloxane refers to the unreacted mercapto-functional siloxane as it exists prior to any reaction with a diene-based elastomer. Inasmuch as the weight of the reacted mercapto-functional siloxane will not appreciably change upon reaction (e.g. a grafting reaction) with a diene-based elastomer, reference may also be made to the weight of the mercapto-functional siloxane residue of the graft copolymer (i.e. the siloxane portion of the graft copolymer formed by reacting the mercapto-functional siloxane with a diene-based elastomer.

Cure System

The skilled person will be able to readily select the amount of vulcanizing agents to achieve the level of desired cure. Also, the skilled person will be able to readily select the amount of cure accelerators to achieve the level of desired cure.

Mixing Procedure

All ingredients of the vulcanizable compositions can be mixed with standard mixing equipment such as Banbury or Brabender mixers, extruders, kneaders, and two-rolled mills. In one or more embodiments, this may include a multi-stage mixing procedure where the ingredients are mixed in two or more stages. For example, in a first stage (which is often referred to as a masterbatch mixing stage), the elastomer, filler and optionally the mercapto-functional siloxane is mixed. This mixing, which takes place in the absence of the curative, can proceed at temperature above which the curing would otherwise take place if the curative was present. For example, this mixing can take place at temperatures in excess of 120° C., in other embodiments in excess of 130° C., in other embodiments in excess of 140° C., and in other embodiments in excess of 150° C. In one or more embodiments, it is believed that these conditions are sufficient to affect a reaction between the diene-based elastomer and the mercapto-functional siloxane.

Once the masterbatch is prepared, the vulcanizing agents may be introduced and mixed into the masterbatch in a final mixing stage, which is typically conducted at relatively low temperatures so as to reduce the chances of premature vulcanization. For example, this mixing may take place at temperatures below 120° C., in other embodiments below 110° C., in other embodiments below 100° C. Additional mixing stages, sometimes called remills, can be employed between the masterbatch mixing stage and the final mixing stage.

As suggested above, in one or more embodiments, the mercapto-functional siloxane reacts with a diene-based elastomer to form a graft copolymer where the siloxane polymer extends from the diene-based elastomer as a graft. Without wishing to be bound by any particular theory, it is believed that the sulfur functionality of the mercapto-functional siloxane reacts with unsaturation along the backbone of the diene-based elastomer to thereby form a covalent bond that results in siloxane grafts at one or more locations along the backbone of the diene-based elastomer. Since the reaction is believed to take place at the unsaturation within the backbone of the diene-based polymer, the diene-based polymer need not otherwise be reactive. For example, in one or more embodiments, the reaction between the mercapto-functional polymer and the diene-based elastomer takes place while the diene-based elastomer is non-living. In accordance with certain embodiments, the mercapto-functional polydimethylsiloxane copolymer reacts along the unsaturated diene polymer chain at a point at least about 1000 g/mol of polymer units from the terminus of the polymer chain. Alternatively, about 2000 g/mol of polymer units from the terminus of the polymer chain, or up to about 3000 g/mol remaining from the terminal of the polymer chain.

As also suggested above, where a reaction takes place between the mercapto-functional siloxane and the diene-based elastomer, the reaction can take place in situ, which refers to a reaction taking place in the presence of at least one additional ingredient of the vulcanizable composition, such as the filler. This in situ reaction can take place during formation of the masterbatch (i.e. it takes place during solid-state mixing). In other embodiments, the reaction can take place after formation of the masterbatch, such as in a remill. For example, the elastomer and the filler can be mixed, and then the mercapto-functional elastomer can be added in a subsequent mixing step, such as remill. Mixing may continue either at elevated temperatures, such as those used to prepare the masterbatch, or remill mixing may take place at lower temperatures.

In yet other embodiments, the graft copolymer can be prepared in advance of the formation of the vulcanizable composition. For example, the mercapto-functional siloxane and a diene-based elastomer may be mixed exclusive of other ingredients of the vulcanizable composition at conditions, such as temperature, sufficient to graft the mercapto-function siloxane to the diene-based elastomer. The resulting mixture, which may include a grafted copolymer, can then be employed in the formation of the vulcanizable compositions of this invention.

Preparation of Tire

The vulcanizable compositions of this invention can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. In particular embodiments, one or more of the compound ingredients, such as the mercapto-functional siloxane or a graft copolymer resulting from a reaction between the mercapto-functional siloxane and a diene-based copolymer, may become crosslinked or otherwise chemically bonded to the crosslinked rubber network. As the skilled person will appreciate, the amounts of the various ingredients, especially those that do not react, will remain within the cured tire component the same as they existed within the compound.

In one or more embodiments, the vulcanizable composition of matter of the present invention are particularly useful for making tire treads. Pneumatic tires can be made as discussed in U.S. Pat. Nos. 5,866,171, 5,876,527, 5,931,211, and 5,971,046, which are incorporated herein by reference. For example, the various tire components can be prepared as green tire components (i.e., uncured tire components), and assembled into a green tire. The green tire can then be subjected to curing conditions to form a vulcanized tire wherein the various green components are generally adhered to one another through the vulcanization process. Depending upon the ultimate use for the rubber composition, it may be processed (e.g., milled) into sheets prior to being formed into any of a variety of components and then vulcanized, which typically occurs at about 5° C. to about 15° C. higher than the highest temperatures employed during the mixing stages, most commonly about 170° C.

Characteristics of Vulcanizate

In one or more embodiments, the vulcanizates of the present invention are characterized by an advantageous balance of properties. In particular embodiments, the vulcanizates are characterized by an advantageous balance between hysteretic loss, wet skid resistance, and low loss of oil, such as polysiloxane, through bleeding.

In one or more embodiments, the vulcanizates of the present invention are characterized by hydrophilic/hydrophobic properties. These properties are believed to contribute to enhanced the wet skid resistance of the vulcanizate.

In these or other embodiments, the vulcanizates of the present invention are characterized by advantageous hysteretic loss properties, which is indicative of lower rolling resistance for tires including one or more components prepared from the compositions of this invention. In one or more embodiments, the vulcanizable composition of this invention therefore product vulcanizates characterized by not only in improved wet traction, but also lowers rolling resistance.

In accordance with certain embodiments, the surfaces of the vulcanized rubbers prepared from the rubber compositions disclosed herein exhibit an adjusted relative hydrophobicity or hydrophilicity as compared to the surfaces of vulcanized rubbers formed from rubber compositions prepared using the same formulation, but using conventional polymers instead of the mercapto-functional polydimethylsiloxane grafted polymer.

The adjustment of the relative hydrophobicity or hydrophilicity of the rubber surface can contribute to the enhancement of the wet traction performance of a tire tread made with the rubber compositions disclosed herein. As mentioned above, due to numerous complex factors involved, the quantitative mechanisms attributable to improved wet traction performance are not completely understood.

However, in combination with other of the complex factors involved, the adjusted relative hydrophobicity or hydrophilicity can act to enhance the wet traction performance, particularly, the wet skid resistance of a tire tread made from the rubber compositions disclosed herein. For example, tire treads having surfaces that are hydrophobic will tend to repulse the water at the tread surface and will likely facilitate the water drainage from between the tire tread's surface and the road surface.

Conversely, tire treads that have a hydrophilic surface will tend to attract water and are more likely to form "adhesive" capillary bridges between the tire tread's surface and the road surface. Thus, by adjusting the relative hydrophobicity or relative hydrophilicity as compared to a vulcanized rubber made from the same composition but with conventional grafted polymer instead of the mercapto-functional polydimethylsiloxane grafted polymer, the rubber compositions disclosed herein can contribute to the enhancement of the wet skid resistance of the tire tread.

Moreover, the use of the mercapto-functional polydimethylsiloxane grafted polymer does not significantly affect certain important bulk mechanical properties of such rubber, including but not limited to properties directed to dynamic viscoelasticity and tensile strength.

Still further, the vulcanizates of one or more embodiments advantageously exhibit relatively low bleed of low molecular weight polymers, such as polysiloxanes, to the surface of the rubber compositions.

The following examples are for purposes of illustration only and are not intended to limit the scope of the claims which are appended hereto.

EXAMPLES

TABLE 1

Properties of mercapto-functionalized polydimethylsiloxane

| | Polymer | Supplier | Viscosity (CPs) | Molecular Weight (g/mol) | Mole % Mercapto Monomer |
|---|---|---|---|---|---|
| Copolymer 1 | SMS-022 | Gelest, Inc. | 120-180 | 6000-8000 | 2-3 |
| Copolymer 2 | PS849 | United Chemical Technology | 100-200 | Not reported | 20-25 |

TABLE 2

Formation and compounding properties of rubber stocks

| | Comparative Example 1 | Example 1 | Example 2 |
|---|---|---|---|
| Compound (phr) | | | |
| SBR | 80 | 80 | 80 |
| NR | 20 | 20 | 20 |
| Silica | 55 | 55 | 55 |
| Silane coupling agent | 5 | 5 | 5 |
| Copolymer 1 | — | 10 | — |
| Copolymer 2 | — | — | 10 |
| Black Oil | 10 | 10 | 10 |
| Stearic Acid | 2 | 2 | 2 |
| Wax | 2 | 2 | 2 |
| Antioxidant | 0.95 | 0.95 | 0.95 |
| Sulfur | 1.5 | 1.5 | 1.5 |
| Accelerator | 0.7 | 0.7 | 0.7 |
| Accelerator | 2 | 2 | 2 |
| Accelerator | 1.4 | 1.4 | 1.4 |
| Zinc Oxide | 2.5 | 2.5 | 2.5 |
| Properties | | | |
| Rolling resistance index | 100 | 103 | 111 |
| Wet skid resistance index | 100 | 105 | 105 |

The characteristics of the mercapto-functionalized polydimethylsiloxane copolymers are shown in Table 1. The ingredients employed in each Sample are presented in Table 2. Each rubber compound was prepared in three stages named initial, remill and final. In the initial mix, SBR, NR, silica, antioxidant, stearic acid, oil and optionally the mercapto-functionalized siloxane copolymer were mixed.

The initial portion of the compound was mixed in a 65 g Banbury mixer operating at 50 RPM and 133° C. First, polymer was placed in the mixer, and after 0.5 minutes, the remaining ingredients except the stearic acid were added. The stearic acid was then added after 3 minutes. The initial stages were mixed for 5 to 6 minutes. At the end of mixing the temperature was approximately 165° C. The sample was transferred to a mill operating at a temperature of 60° C., where it was sheeted and subsequently cooled to room temperature.

The remill was mixed by adding the resulting initial mixture and silane shielding agent to the mixer simultaneously. The initial mixer temperature was 95° C. and it was operating at 50 RPM. The final material was removed from the mixer after three minutes when the material temperature was 150° C. The sample was transferred to a mill operating at a temperature of 60° C., where it was sheeted and subsequently cooled to room temperature.

The final stage was mixed by adding the remill mixture and the curative materials to the mixer simultaneously. The initial mixer temperature was 65° C. and it was operating at 45 RPM. The final material was removed from the mixer after 2.5 minutes when the material temperature was between 95 to 105° C. The final mixtures were sheeted into buttons and bars for testing wet traction. The samples were cured at 171° C. for 15 minutes in standard molds placed in a hot press.

For evaluation of a vulcanized rubber, wet skid resistance index measured according to ASTM E303-83 using a portable skid tester made by Stanley Inc. The wet skid number was indexed to Comparative Example 1.

Rolling resistance index was measured as the tan delta value of each compound using an ARES viscoelasticity tester made by TA Instruments—Water LLC under the following conditions: 50° C., 15 Hz frequency and 10% dynamic strain. The rolling resistance was indexed to Comparative Example 1. The larger the index value, the lower the rolling resistance is. The rolling resistance index and wet skid resistance index are shown in Table 2.

As shown in Table 1, Examples 1 and 2 were prepared using the mercapto-functionalized polydimethylsiloxane copolymers identified as Copolymer 1 and 2. Comparative Example 1 did not include a mercapto-functionalized polydimethylsiloxane copolymer.

The results provided in Table 2 show that the use of mercapto-functionalized polydimethylsiloxane copolymers (Examples 1 and 2) adjusts the relative hydrophobicity or hydrophilicity of the vulcanizate as compared to the control vulcanizate of Comparative Example 1 prepared, including no mercapto-functionalized polydimethylsiloxane copolymer.

Similar experiments were conducted using polysiloxanes that were not mercapto-functionalized; i.e. the polysiloxanes did not include a mercapto-functional group. Vulcanizable compositions including these non-functional siloxanes were vulcanized, and upon aging, it was observed that oils, which were believed to include polysiloxane oils, appreciably bled from the vulcanizate. This level of oil bleed was significant and appreciable compared to those samples wherein a mercapto-functional siloxane was employed.

Various modifications and alterations that do not depart from the scope and spirit of this invention will become apparent to those skilled in the art. This invention is not to be duly limited to the illustrative embodiments set forth herein.

What is claimed is:

1. A vulcanizate prepared by a method comprising:
   a. introducing an elastomer, a filler, and a mercapto-functional siloxane to form a masterbatch; and
   b. introducing a curative to the masterbatch to form a vulcanizable composition;
   where the mercapto-functional siloxane includes at least one of each of the following repeat units:

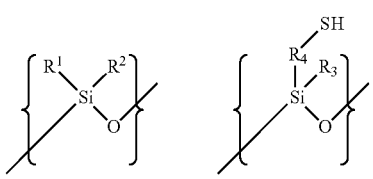

where R1, R2, and R3 are each independently a monovalent organic group and each R4 is a divalent organic group; or where the mercapto-functional siloxane is defined by the formula:

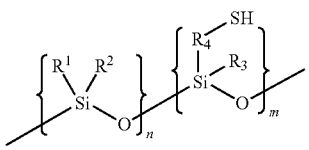

where $R^1, R^2, R^3$ are each independently a hydrocarbyl group, each $R^4$ is a divalent organic group, and m and n are integers and the ratio of m to (m+n) is from about 0.03 to about 0.08.

2. The vulcanizate of claim 1, where the elastomer is a diene-based elastomer.

3. The vulcanizate of claim 1, where the filler includes silica.

4. The vulcanizate of claim 1, where said step of introducing introduces from about 5 to about 200 parts by weight filler per one hundred parts by weight elastomer and from about 0.5 to about 20 parts by weight mercapto-functional siloxane per one hundred parts by weight elastomer.

5. The vulcanizate of claim 1, where the vulcanizate is a tire tread.

6. A vulcanizable composition comprising:
   a. an elastomer;
   b. from about 0.5 to about 20 parts by weight of a mercapto-functional siloxane per one hundred parts by weight elastomer;
   c. from about 5 to about 200 parts by weight of a filler; and
   d. a curative for the elastomer;
where the mercapto-functional siloxane includes at least one of each of the following repeat units:

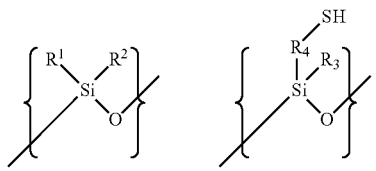

where R1, R2, and R3 are each independently a monovalent organic group and each R4 is a divalent organic group; or where the mercapto-functional siloxane is defined by the formula:

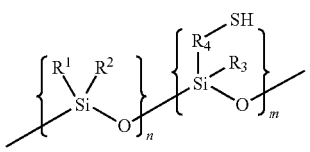

where $R^1$, $R^2$, and $R^3$ are each independently a hydrocarbyl group, each $R^4$ is a divalent organic group, and m and n are integers and the ratio of m to (m+n) is from about 0.03 to about 0.08.

7. The vulcanizable composition of claim 6, where the mercapto-functional siloxane is a distinct molecular species within the vulcanizable composition.

8. The vulcanizable composition of claim 6, where the mercapto-functional siloxane is covalently bonded at least one of said elastomer.

9. The vulcanizable composition of claim 6, where the elastomer is a diene-based elastomer.

10. The vulcanizable composition of claim 6, where the filler includes silica.

11. The use of the vulcanizable composition of claim 6 in the preparation of a tire tread.

12. The vulcanizable composition of claim 6, further comprising a graft copolymer prepared by reacting the mercapto-functional siloxane with the elastomer, where the elastomer is diene-based elastomer.

13. The vulcanizable composition of claim 12, where the graft copolymer is prepared by:
   a. introducing the diene-based elastomer and the mercapto-functional siloxane to form a mixture; and
   b. subjecting the mixture to conditions that will react the mercapto-functional siloxane to the diene-based elastomer.

14. The vulcanizable composition of claim 12, where the filler includes silica.

15. A method for preparing a tire, the method comprising:
   a. introducing an elastomer, a filler, and a mercapto-functional siloxane to form a masterbatch;
   b. introducing a curative to the masterbatch to form a vulcanizable composition;
   c. forming the vulcanizable composition into a green tire tread;
   d. building a green tire by using the green tire tread as the tire tread component of the green tire; and
   e. subjecting the green tire to curing conditions to form a tire;
where the mercapto-functional siloxane includes at least one of each of the following repeat units:

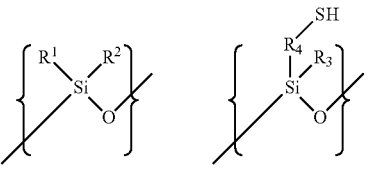

where R1, R2, and R3 are each independently a monovalent organic group and each R4 is a divalent organic group; or where the mercapto-functional siloxane is defined by the formula:

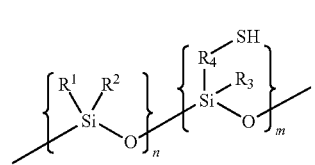

where $R^1$, $R^3$, $R^3$ are each independently a hydrocarbyl organic group, each $R^4$ is a divalent organic group, and m and n are integers and the ratio of m to (m+n) is from about 0.03 to about 0.08.

* * * * *